United States Patent
Choi et al.

(10) Patent No.: US 8,270,416 B2
(45) Date of Patent: Sep. 18, 2012

(54) DATA TRANSMISSION PATH SETTING APPARATUS AND METHOD FOR AD-HOC NETWORK

(75) Inventors: Young-gon Choi, Yongin-si (KR); Eun-Il Seo, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 707 days.

(21) Appl. No.: 11/042,056

(22) Filed: Jan. 26, 2005

(65) Prior Publication Data

US 2005/0165957 A1 Jul. 28, 2005

(30) Foreign Application Priority Data

Jan. 27, 2004 (KR) .......................... 10-2004-004953

(51) Int. Cl.
*H04L 12/28* (2006.01)
(52) U.S. Cl. ...................................... 370/401
(58) Field of Classification Search .................. 370/329, 370/466, 349, 351–430
See application file for complete search history.

(56) References Cited

U.S. PATENT DOCUMENTS

| | | | | |
|---|---|---|---|---|
| 5,430,728 A * | 7/1995 | Narayanan et al. | ........... | 370/404 |
| 6,704,293 B1 * | 3/2004 | Larsson et al. | ................ | 370/255 |
| 6,826,165 B1 * | 11/2004 | Meier et al. | ................ | 370/338 |
| 6,977,938 B2 * | 12/2005 | Alriksson et al. | ............ | 370/401 |
| 7,002,917 B1 * | 2/2006 | Saleh | ............................. | 370/238 |
| 7,039,014 B1 * | 5/2006 | Krishnamurthy et al. | ..... | 370/244 |
| 7,058,728 B1 * | 6/2006 | Eklund | ......................... | 709/247 |
| 7,139,262 B1 * | 11/2006 | Elliott | ........................... | 370/351 |
| 7,177,295 B1 * | 2/2007 | Sholander et al. | ............ | 370/338 |
| 7,398,322 B1 * | 7/2008 | Perlman | ....................... | 709/239 |
| 2002/0031135 A1 * | 3/2002 | Inoue | ............................ | 370/401 |
| 2004/0083306 A1 * | 4/2004 | Gloe | ............................. | 709/245 |
| 2005/0169238 A1 * | 8/2005 | Yang et al. | .................... | 370/351 |
| 2005/0180356 A1 * | 8/2005 | Gillies et al. | ................. | 370/329 |

OTHER PUBLICATIONS

Jeongkeun. Lee , Hybrid gateway advertisement scheme for connecting mobile. ad hoc networks to the Internet, dated 2003.*

* cited by examiner

*Primary Examiner* — Gregory Sefcheck
*Assistant Examiner* — Daniel Mitchell
(74) *Attorney, Agent, or Firm* — Staas & Halsey LLP

(57) ABSTRACT

A communication method for a mobile communication system having a node for sending data to a gateway via neighboring nodes and gateways for sending the data from the nodes to an Internet network, and for setting a path for data transmissions between a gateway and a node, including: transmitting via the gateway a message including path information and a prefix; and setting a path for sending data to the node that sent the message, when a node that received the message, directly or via another node, has the data to be sent to the gateway; and sending the data via the set path.

10 Claims, 5 Drawing Sheets

DATA TRANSMISSION PATH SETTING APPARATUS AND METHOD FOR AD-HOC NETWORK

CROSS-REFERENCE TO RELATED APPLICATION

This application claims benefit under 35 U.S.C. §119 from Korean Patent Application No. 2004-4953, filed on Jan. 27, 2004, the disclosure of which is incorporated by reference.

BACKGROUND OF THE INVENTION

1. Field of the Invention

The present invention relates to a method for setting a path between a gateway and a node that are structuring an ad-hoc network, and more particularly, to a method for setting a path for sending data from the node to the gateway.

2. Description of Related Art

General mobile communication systems transmit and receive data between a mobile element and a base station. The mobile terminal and the base station directly transmit and receive data without passing through other mobile terminals and nodes. However, the ad-hoc network uses other nodes in transmitting data of a specific node to a gateway (GW).

Hereinafter, description will be made on a structure of the ad-hoc network with reference to FIG. 1. As shown in FIG. 1, the ad-hoc network has a gateway and plural nodes. In FIG. 1, the nodes are represented by circles. FIG. 1 shows only one gateway, but the ad-hoc network can have at least two gateways according to user's setting.

The gateway transmits to a different communication system such as the Internet network data transmitted by nodes constructing the ad-hoc network. The plural nodes transmit data to the gateway. The nodes, which are located within a certain distance from the gateway, directly transmit data to the gateway. However, nodes which are located beyond the certain distance transmit collected data to nodes neighboring the gateway instead of directly transmitting the data to the gateway. That is, the nodes beyond the certain distance transmit data by using neighboring nodes, which minimizes power consumption for data transmissions. And, the distance between a gateway and a node is proportional to the power consumption for the node to transmit specific data. Thus, the nodes beyond a certain distance from the gateway transmit the collected data by use of plural nodes, so the power consumption can be minimized during data transmission. Hereinafter, nodes which relay data of other nodes are called "relay nodes." The relay nodes transmit data which they collect, directly or through different relay nodes, to the gateway.

Hereinafter, description will be made on a process for setting a path through which nodes constructing an ad-hoc network transmit data to a gateway. The path for data transmissions is established through the following four steps:

Gateway Solicitation Process
Gateway Advertisement Process
Process for generating a Global Address for Internet
Sending Data Hereinafter, description will be made of the above four steps for setting a path for data transmissions with reference to FIG. 2. The Gateway Solicitation Process (S200) is a process for a node entered in an ad-hoc network to solicit a gateway location. The node can transmit data to the gateway only when the node knows where the gateway is located. Thus, the node broadcasts a message including information on its own address and information requesting a gateway address. Neighboring nodes having received the message decide whether to be the gateway requested by the node. In general, the gateway is aware that it is a gateway. Therefore, the neighboring nodes that have received the message update and transmit the received message to different neighboring nodes. That is, the neighboring nodes take out of the received message and store the information of the addresses of the nodes sending the message, and send a message having their own address information. The above process is carried out until the message sent by the node is delivered to the gateway. The gateway can recognize that the node solicits a response, using the information included in the sent message. The message the node has sent is transmitted to at least one gateway constructing the ad-hoc network.

The network that has carried out the Gateway Solicitation Process performs the Gateway Advertisement Process (S202). The Gateway Advertisement Process is a process by which the gateway which finally received the message the note had sent transmits its own address information to the node. The gateway extracts the address information of the node included in the message received in the Gateway Solicitation Process. The gateway transmits a message including its own address information to the node having the extracted address information. Unlike the Gateway Solicitation Process, the message received and sent in the Gateway Advertisement Process is unicast. That is, the message the gateway has sent can be unicast to the node by use of the address information obtained in the Gateway Solicitation Process. Further, the nodes that received the message the gateway had sent count the number of hops. That is, the nodes add one to the number of hops included in the message received from a previous node, and send the number of hops added by one to a next node. The process as above enables the node requesting the location information of the gateway to obtain the location information of the gateway and the number of hops up to the gateway. And, if plural gateways exist, the node can obtain the information of the individual gateways.

The process for generating a Global Address for Internet (S204) is a process for the node to generate his unique address by use of its obtained information. If a gateway is picked up for data to be sent, the node sends data by use of an established path (S206).

However, it takes a long time to send data through the above-described processes for data transmission. Thus, there is a need for a method which reduces the time required to send data from a node included in the ac-hoc network to a gateway.

BRIEF SUMMARY

The present invention has been developed to solve the above and/or other drawbacks and problems associated with the conventional arrangement. An aspect of the present invention is to provide an apparatus and a method for reducing time required to set a path for data transmissions.

Another aspect of the present invention is to provide apparatus and method for setting a path with the fewest errors in setting the path for data transmissions.

Yet another aspect of the present invention is to provide apparatus and method for efficiently sending data by use of an established path.

A method according to the present invention establishes a path for transmissions of data to a gateway from a node without the gateway Solicitation Process.

According to an aspect of the present invention, there is provided a communication method for a mobile communication system having a node for sending data to a gateway via neighboring nodes and gateways for sending the data from the nodes to an Internet network, and for setting a path for data transmissions between a gateway and a node, including: transmitting via the gateway a message including path information and a prefix; and setting a path for sending data to the node that sent the message, when a node that received the message, directly or via another node, has the data to be sent to the gateway; and sending the data via the set path.

According to another aspect of the present invention, there is provided a mobile communication system having a node for sending data to a gateway via neighboring nodes and gateways for sending the data from the nodes to an Internet network, and for setting a path for data transmissions between a gateway and a node, including: a gateway transmitting to the neighboring nodes a message including path information and a prefix; and nodes receiving the message directly or via another node, and, setting a path for sending data to the node that sent the message when there is data to be sent.

According to another aspect of the present invention, there is provided a method of reducing error in data transmission, including: transmitting, via a gateway, a message including path information, hop information, and a prefix; setting a path for sending data to a node that sent the message, when a node that received the message, directly or via another node, has data to be sent to the gateway; and sending the data via the set path. When the message sent by the gateway is received by two or more nodes or gateways, the path is set to a node that sent the message and requires the fewest hops.

According to another aspect of the present invention, there is provided a data communication method, including: receiving an advertisement message from neighboring nodes or a gateway; extracting from the received message path information, a number of hops, and a prefix of the nodes or gateway having sent the message; storing the extracted path information, the number of hops, and the prefix, and adding 1 to the number of hops included in the message before the storing; updating the information included in the message by replacing the address information included in the message with its own address information and adding 1 to the number of hops included in the message; sending the updated message to neighboring nodes; and setting a path through which data is to be transmitted by selecting one of the nodes or gateways that sent the message.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENT

Figure 1:
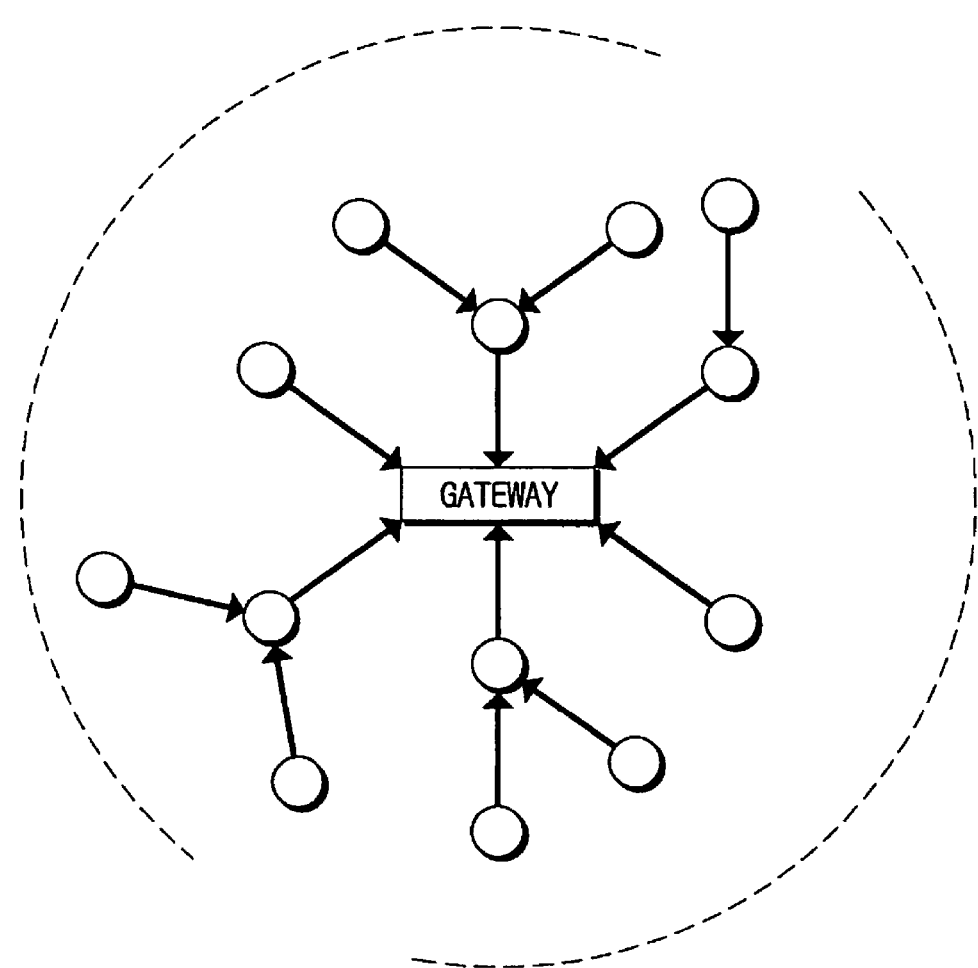
FIG. 1 is a diagram showing a conventional ad-hoc network structure.
Figure 2:
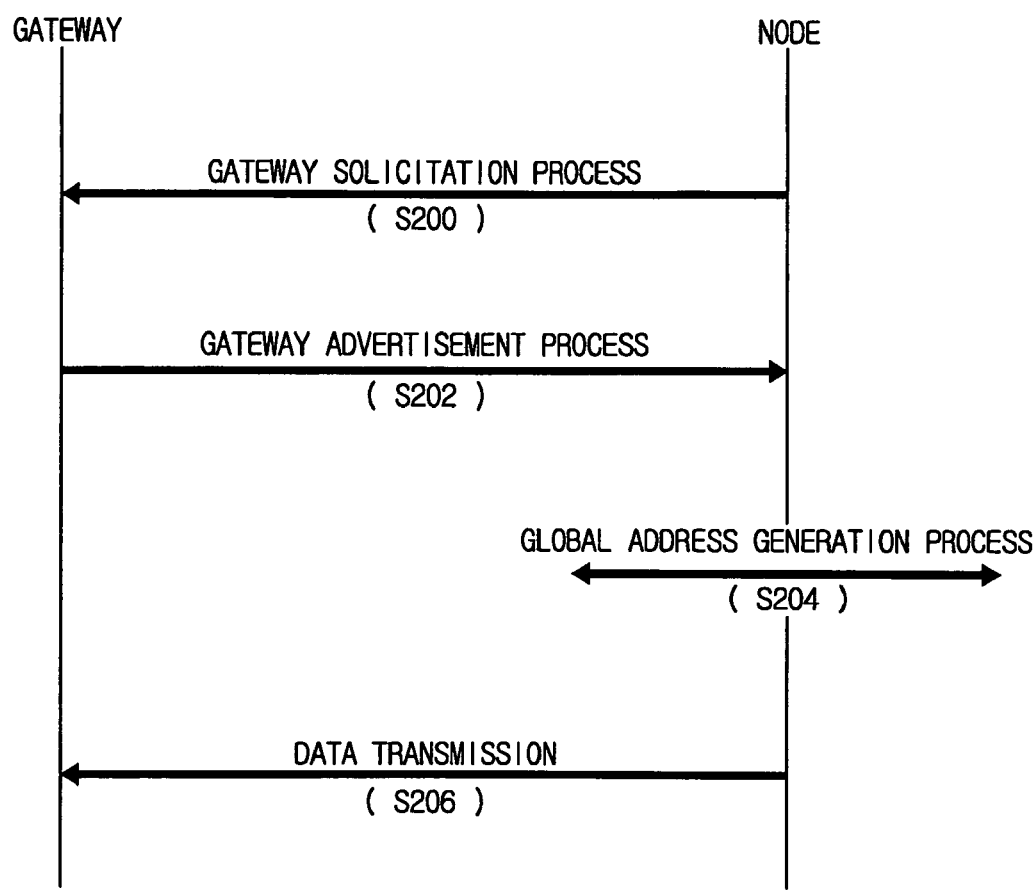
FIG. 2 is a diagram showing a process for setting a path for a node constructing an ad-hoc network such as that shown in FIG. 1 to transmit data to a gateway.

Reference will now be made in detail to an embodiment of the present invention, examples of which are illustrated in the accompanying drawings, wherein like reference numerals refer to the like elements throughout. The embodiment is described below in order to explain the present invention by referring to the figures.

A gateway periodically broadcasts a message including its own path information and prefix. The periodic broadcasts of the message by the gateway can vary depending on user's setting. Hereinafter, description will be made on operations for nodes and a gateway that construct an ad-hoc network according to an embodiment of the present invention to carry out for setting a path therebetween with reference to FIG. 3.

A gateway 310 broadcasts a message including its own information and a prefix to neighboring nodes every predetermined period of time. The reference number 340 of FIG. 3 denotes a range in which a message broadcast by the gateway can be transmitted. The range allowing data of the gateway 310 to be received can vary depending on wireless environments, but, for the convenience of explanation of the present embodiment, the range allowing the data of the gateway 310 to be received is assumed to be fixed.

Figure 3:
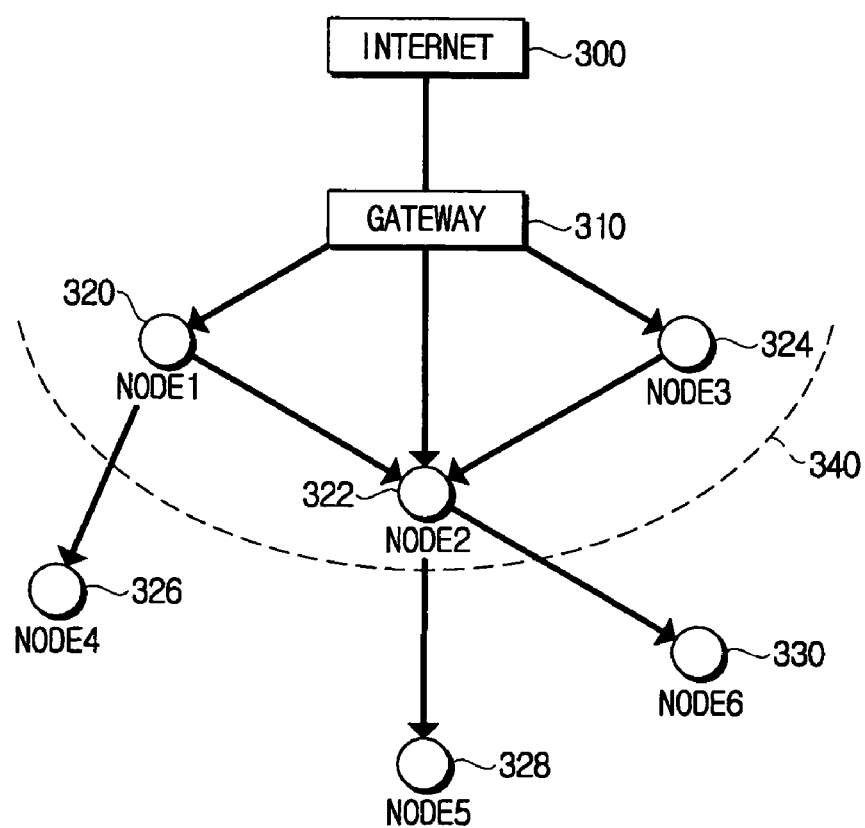
FIG. 3 is a diagram showing a process for setting a path for data transmissions in an ad-hoc network according to an embodiment of the present invention.

In FIG. 3, nodes 320, 322, and 324 (node1, node2, and node3) receive a message broadcast by the gateway 310. The nodes 320, 322, and 324 that received the message of the gateway 310 extract the address and path information of the gateway 310 included in the message. The extracted address and path information is stored in a routing table. Table 1 below shows an exemplary routing table stored in node 322.

TABLE 1

| Gateway | xxx.yyy.123 |
|---------|-------------|
| Node1   | xxx.yyy.133 |
| .       | .           |
| .       | .           |
| Node3   | xxx.yyy.234 |

Node 322 storing the routing table as Table 1 becomes aware of the address and path information of the gateway 310 and the address information of nodes 320 and 324. Node 322 is supposed to receive from the neighboring nodes 320 and 324 the path information of the gateway 310 as well as the prefix broadcast by the gateway 310. Thus, node 322 stores in the routing table the address and path information of the nodes that have transmitted prefixes. As shown in Table 1, the address information of the gateway 310 is xxx.yyy.123, and the address information of node 320 is xxx.yyy.133. The address information of node 324 is xxx.yyy.234. Description will be made as below of a process for node 322 to receive messages sent from nodes 320 and 324. The nodes 320, 322, and 324 that received the message from the gateway 310 send to neighboring nodes messages including their own path information and prefixes.

Node 320 sends a message to nodes 322 and 324, and the node 322 sends a message to nodes 328 and 330 (nodes 5 and 6). Node 324 sends a message to node 322. Through the above process, node 322 can receive the messages sent by nodes 320 and 324.

Further, nodes 320, 322, and 324 also send the number of hops (i.e., a counter) taken to receive the message sent by the gateway 310. That is, nodes 320, 322, and 324 store a value obtained by adding 1 to the number of hops that is included in the information sent by a neighboring node or the gateway 310. Table 2 shows the number of hops for the messages received by and stored in node 322.

TABLE 2

| Gateway | 1 |
|---|---|
| Node1 | 2 |
| . | . |
| . | . |
| . | . |
| NodeN | 2 |

Table 2 shows that node 322 has the numbers of hops different depending on the paths through which the address information of the gateway 310 has been received. That is, the number of hops for the message received from the gateway 310 is 1 and the number of hops for the message received from node 320 or 324 is 2.

Node 322 stores the information such as Table 1 or Table 2, and, at the same time, sends the information to neighboring nodes. The message sent by node 322 includes the path information of its own, the number of hops to the gateway 310, and the prefix of the gateway 310. Nodes 328 and 330 that have received the message sent by node 322 perform the same operations as node 322. That is, nodes 328 and 330 update and store the message received from node 322, and send to neighboring nodes the same information as stored. Through the above process, the nodes constructing the ad-hoc network become aware of the prefix, the number of hops up to the gateway 310, and the address and path information of the neighboring nodes that have sent the message.

Nodes 320, 322, and 330 that have received the prefix perform a global address generation process. The received prefix is used to generate a global address.

Nodes 320 to 330 that have received the prefix perform a Global Address generation process. The received prefix is used for the Global Address generation. If nodes 320 to 330 receive the prefix through at least two paths, nodes 320 to 330 have to choose one path for transmitting data. Nodes 320 to 330 transmit data to the gateway 310 through the chosen path. Nodes 320 to 330 use the number of hops up to the gateway 310 to choose the path for transmitting the data. The time required to transmit the data becomes shorter as well as the error occurrence probability during the data transmissions can be reduced, as the number of hops up to the gateway 310 is smaller.

Figure 4:
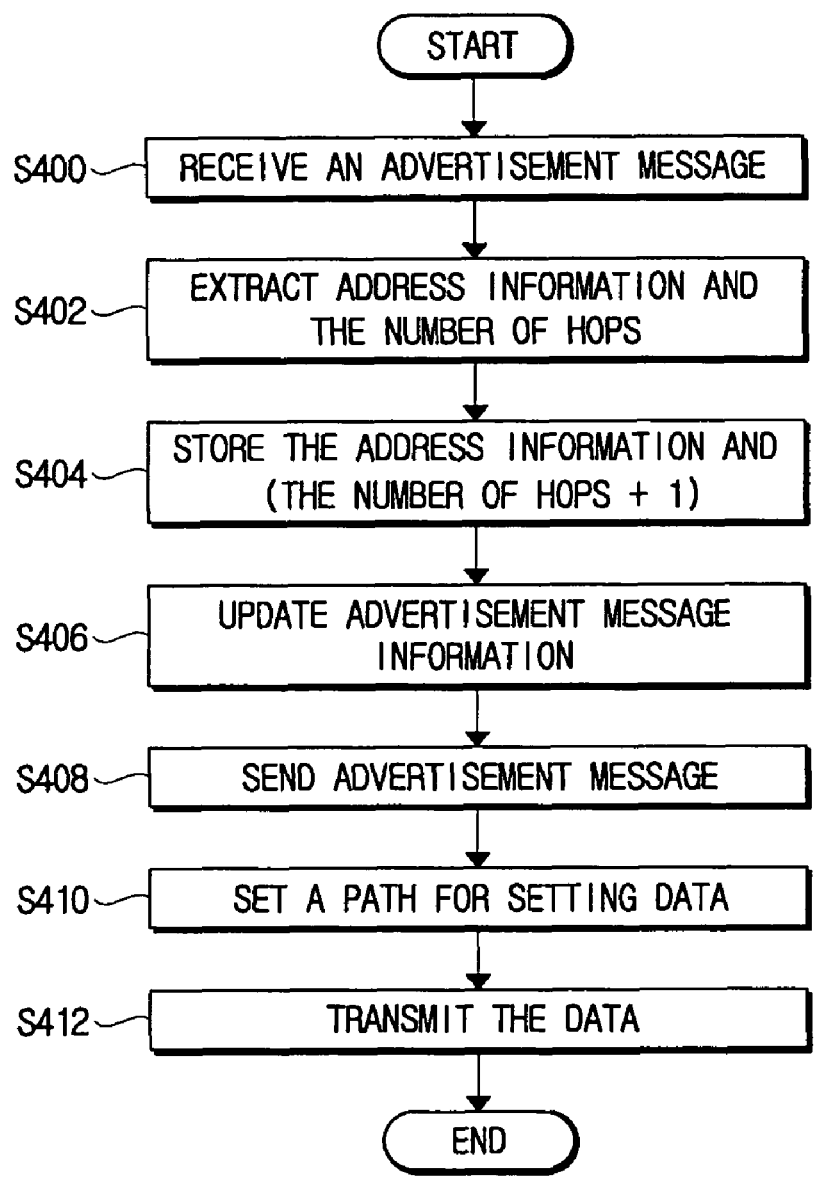
FIG. 4 is a flowchart for showing operations carried out in a node according to an embodiment of the present invention.

FIG. 4 is a flowchart showing operations carried out in nodes constructing an ad-hoc network according to an embodiment of the present invention. Hereinafter, a description will be made in detail on the operations of the nodes constructing the ad-hoc network with reference to FIG. 4.

A node receives an Advertisement message (S400). The node receives the Advertisement message from neighboring nodes or a gateway. The node extracts from the received message the path information, the number of hops, and a prefix of the nodes and gateway having sent the message (S402). The node stores the extracted path information, the number of hops, and the prefix (S404). The node adds 1 to the number of hops included in the received message before storage.

The node updates the information included in the received Advertisement message (S406). That is, the node replaces the address information included in the received Advertisement message with its own address information. Further, the node updates the number of hops by adding 1 to the number of hops included in the received Advertisement message. The node sends the updated message to the neighboring nodes (S408). If data to be sent to the gateway occurs, the node sets a path through which it transmits the data. The node uses the number of hops included in the received message to set the path through which it transmits the data. That is, if the node receives the message, the node selects one of the nodes or the gateway that has sent the message.

The node selects the node or the gateway that has sent the message having the lowest number of hops. Further, the node uses the prefix included in the received message for an internet network address. The node uses a selected path to transmit data (S412). Further, the node also transmits through the selected path data that neighboring nodes have sent.

Figure 5:
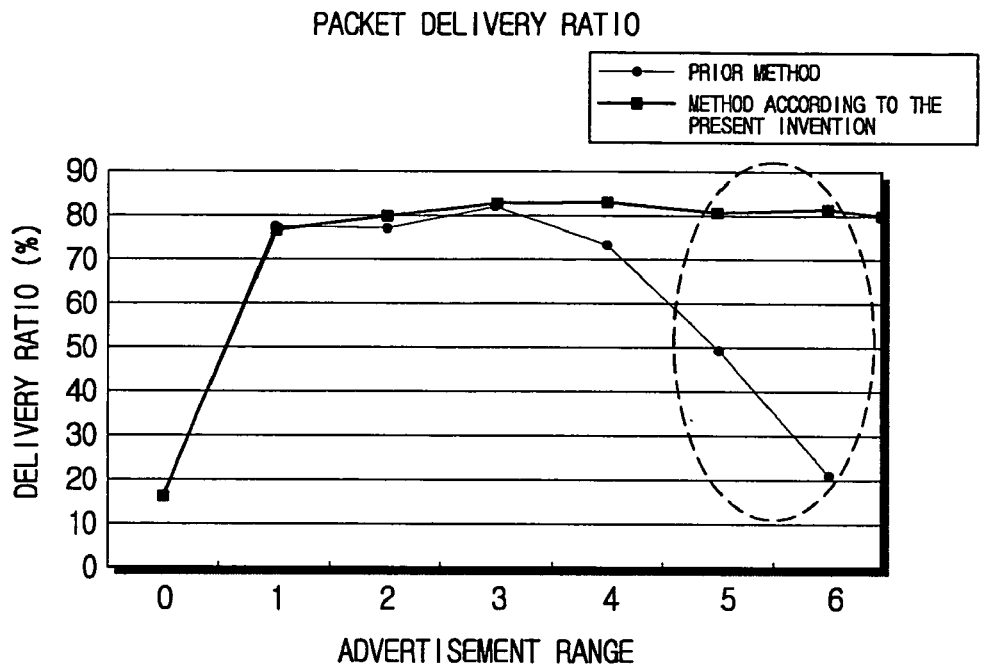
FIG. 5 is a view for showing an effect of the embodiment of FIGS. 3 and 4.
Figure 6:
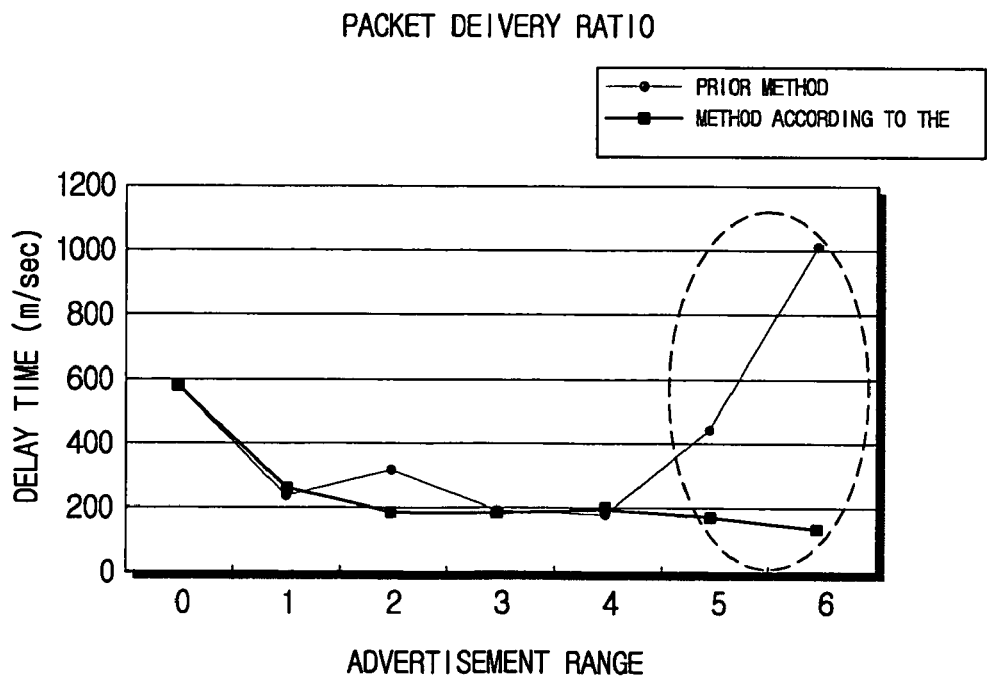
FIG. 6 is a view for showing another effect of the embodiment of FIGS. 3 and 4.

FIG. 5 and FIG. 6 are views showing effects of the present embodiment of the present invention. FIG. 5 shows packet delivery ratios, and FIG. 6 shows delay times from a packet delivery node to a packet reception node. The packet delivery ratio indicates the number of received packets to the number of delivered packets. As shown in FIG. 5 and FIG. 6, the method according to the present embodiment has higher packet delivery ratios and lower delay times compared to the related art.

The above-described method of the present embodiment does not carry out the Gateway Solicitation Process in setting a path for transmitting data from a node to a gateway. The use of the method according to the present embodiment leads to reducing time required to set a path for data transmissions. Further, the method selects a path having the fewest number of hops out of plural paths, to thereby shorten the data transmission time.

Although an embodiment of the present invention have been shown and described, the present invention is not limited to the described embodiment. Instead, it would be appreciated by those skilled in the art that changes may be made to the embodiment without departing from the principles and spirit of the invention, the scope of which is defined by the claims and their equivalents.

What is claimed is:

1. A communication method for a mobile communication system having a node for sending data to a gateway of an ad hoc network via neighboring nodes and gateways of the ad hoc network for sending the data from the nodes to an Internet network, and for setting a path for data transmissions between a gateway and a node, comprising:

broadcasting a message including path information and a prefix at predetermined intervals from the gateway to the nodes;

setting a path for sending data to the gateway that sent the message, when the node that received the message, directly or via another node, has the data to be sent to the gateway; and sending the data via the set path, wherein the nodes do not perform a Gateway Solicitation Process before the gateway broadcasts the message, wherein the message includes a number of hops, wherein each node that receives the message replaces internet protocol (IP) address included in the message with its own IP address, wherein the Gateway Solicitation Process is a process for nodes entered in the ad hoc network to solicit a location of the gateway, and wherein each node that receives the message performs a global address generation process using the prefix to generate a unique address.

2. The method of claim 1, wherein, when the message sent by the gateway is received, the path is set to the gateway which sent the message and which required the fewest hops to send the message.

3. The method of claim 1, wherein each node that receives the message adds 1 to the number of hops included in the message, and sends the number of hops to other neighboring nodes.

4. The method of claim 1, wherein each node that receives the message extracts the path information and stores the extracted information in a routing table.

5. A mobile communication system having a node for sending data to a gateway of an ad hoc network via neighboring nodes and gateways of the ad hoc network for sending the data from the nodes to an Internet network, and for setting a path for data transmissions between a gateway and a node, comprising:

nodes receiving a message from the gateway directly or via another node, and, setting a path for sending data to the gateway that sent the message, when there is data to be sent, wherein the gateway broadcasts the message to the neighboring nodes at predetermined intervals, the message including path information and a prefix, wherein the nodes do not perform a Gateway Solicitation Process before the gateway broadcasts the message, wherein the message includes a number of hops and a prefix, wherein the node replaces Internet Protocol (IP) address included in the received message with its own IP address, and sends the message to the neighboring nodes, wherein the Gateway Solicitation Process is a process for nodes entered in the ad hoc network to solicit a location of the gateway, and wherein each node that receives the message performs a global address generation process using the prefix to generate a unique address.

6. The mobile communication system of claim 5, wherein, when the message sent by the gateway is received, the path is set to the gateway which sent the message and which required the fewest hops to send the message.

7. The mobile communication system of claim 5, wherein each neighboring node adds 1 to the number of hops included in the message, and sends the number of hops to the neighboring nodes.

8. A method of reducing error in data transmission, comprising:

broadcasting a message including path information, hop information, and a prefix from the gateway of an ad hoc network at predetermined intervals to nodes, wherein hop information includes a number of hops;

setting a path for sending data to the gateway that sent the message, when a node that received the message, directly or via another node, has data to be sent to the gateway; and sending the data via the set path, wherein, when the message sent by the gateway is received, the path is set to the gateway that sent the message and requires the fewest hops, wherein the nodes do not perform a Gateway Solicitation Process before the gateway broadcasts the message, wherein each node that receives the message replaces Internet Protocol (IP) address included in the message with its own IP address, wherein the Gateway Solicitation Process is a process for nodes entered in the ad hoc network to solicit a location of the gateway, and wherein the prefix is used for an Internet network address.

9. A data communication method, comprising:

broadcasting a message including path information and a prefix at predetermined intervals from the gateway to the nodes;

receiving the message from neighboring nodes to which the message is transmitted from the gateway or the gateway of an ad hoc network at predetermined intervals;

extracting from the received message path information, a number of hops, and a prefix of the nodes or gateway having sent the message;

storing the extracted path information, the number of hops, and the prefix, and adding 1 to the number of hops included in the message before the storing;

updating the information included in the message by replacing the Internet Protocol (IP) address included in the message with its own IP address and adding 1 to the number of hops included in the message;

sending the updated message to neighboring nodes; and setting a path through which data is to be transmitted by selecting one of the neighboring nodes or the gateway that sent the message, wherein the nodes do not perform a Gateway Solicitation Process before the gateway broadcasts the message, wherein the setting includes using the number of hops included in the message to set the path, wherein the Gateway Solicitation Process is a process for nodes entered in the ad hoc network to solicit a location of the gateway, and wherein the prefix is used for an Internet network address.

10. The method of claim 9, wherein the path includes the node or gateway that sent the message and requires the fewest hops.

* * * * *

UNITED STATES PATENT AND TRADEMARK OFFICE
CERTIFICATE OF CORRECTION

PATENT NO. : 8,270,416 B2
APPLICATION NO. : 11/042056
DATED : September 18, 2012
INVENTOR(S) : Young-gon Choi et al.

Page 1 of 1

It is certified that error appears in the above-identified patent and that said Letters Patent is hereby corrected as shown below:

In the Claims:

Column 6; Line 55-56; In Claim 1, delete "internet protocol" and insert -- Internet Protocol --, therefor.

Signed and Sealed this
Fourteenth Day of May, 2013

Teresa Stanek Rea
*Acting Director of the United States Patent and Trademark Office*